Dec. 23, 1952     E. J. WAGNER     2,622,839
FAUCET
Filed May 14, 1947
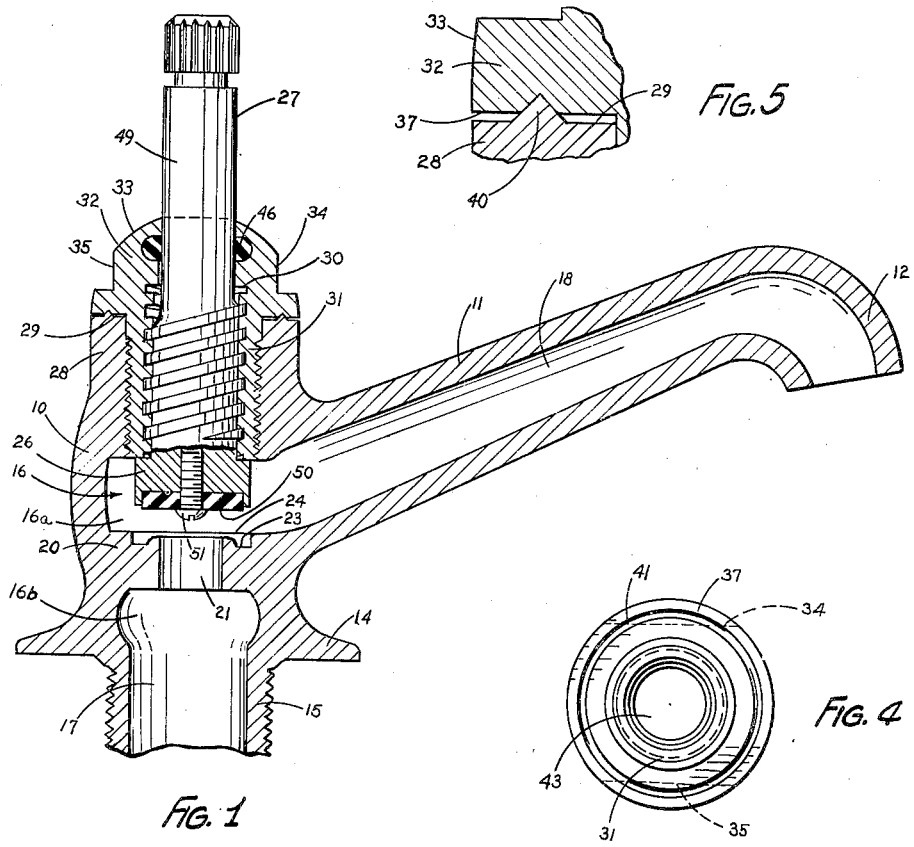
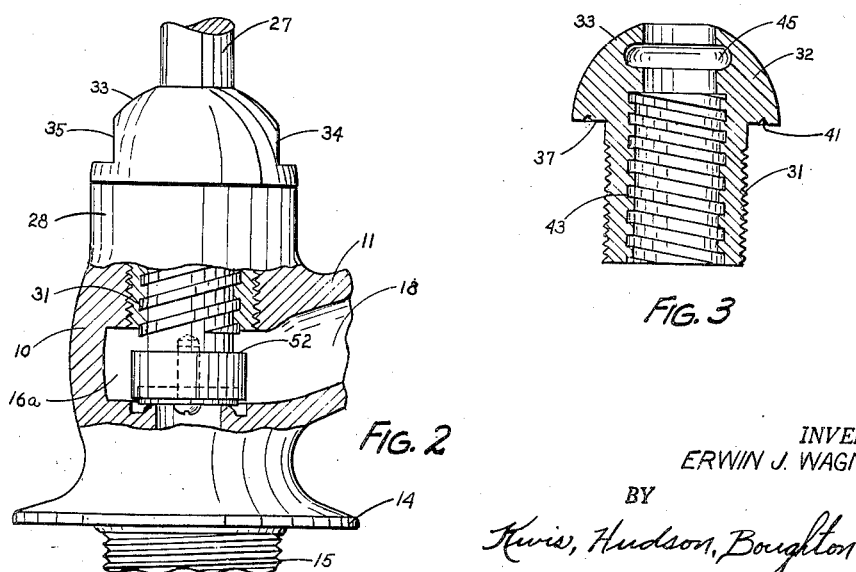
INVENTOR.
ERWIN J. WAGNER
BY
Kwis, Hudson, Boughton & Williams
ATTORNEYS Patented Dec. 23, 1952

2,622,839

UNITED STATES PATENT OFFICE 2,622,839

FAUCET

Erwin J. Wagner, Cleveland, Ohio

Application May 14, 1947, Serial No. 748,072

1 Claim. (Cl. 251—49)

The invention pertains to the art of valves and, more particularly, to a faucet valve of improved and simplified construction.

An object of the invention is the provision of a new and improved valve of the faucet valve type which is simple in construction, economical to manufacture, attractive in appearance, easily and readily assembled, has a minimum number of parts, and is substantially leakproof in all of the connections between the various parts.

Another object of the invention is the provision of a new and improved faucet valve having a valve body including an integrally formed valve seat, an opening aligned with the seat, and a detachable valve stem bushing forming a closure for the opening, the bushing and body having generally continuous and flush outer surfaces for presenting a smooth, streamlined, and attractive appearance, and opposed parallel surfaces so formed as to provide a leakproof metal-to-metal seal without the use of additional packing or other means.

Another object of the invention is the provision of a new and improved faucet valve having a valve body including a valve seat, a valve engageable with the seat, a valve stem for movably supporting the valve, and a valve stem bushing for movably supporting the valve stem, the valve stem and valve stem bushing having a simply formed and leakproof packing therebetween comprising a rubber-like ring element generally circular-shaped in cross section mounted in a groove in one of the members and radially compressed against the other member.

Still another object of the invention is the provision of a new and improved faucet valve having a hollow valve body including a valve seat and an opening aligned with the valve seat, a valve stem for movably supporting a valve and opening and closing the opening, and a bushing forming a closure for the opening and movably supporting the valve stem, the bushing and the valve body having flush outer surfaces and opposed mating surfaces of limited area around the opening for providing a metal-to-metal seal therebetween, the bushing and the valve stem being provided with an O-ring type packing whereby an attractive appearing valve and packing between the parts of the valve is obtained using a minimum number of component parts.

The invention resides in certain constructions and combinations and arrangements of parts, and further objects and advantages will be apparent to those skilled in the art to which it relates from the following description of the preferred embodiment described with reference to the accompanying drawings forming a part of this specification, and in which:

Fig. 1 is a side sectional view of a faucet valve embodying the present invention, the valve proper being shown in the open or spaced position from its valve seat;

Fig. 2 is a side elevational view of Fig. 1 with portions broken away to show the valve proper in a closed position;

Fig. 3 is a detailed sectional view of a valve stem bushing, taken approximately on the line 3—3 of Fig. 1;

Fig. 4 is a bottom end view of Fig. 3; and

Fig. 5 is an enlarged fragmentary sectional view of Fig. 1 showing a metal-to-metal seal between the valve stem bushing and the valve body.

Referring to the drawings, the preferred embodiment of the invention is shown in a faucet valve comprising a generally circular elongated body 10 having a spigot 11 intermediate its ends extending sidewardly at a slight upward angle and terminating in a downwardly extending spout 12. The form of the spigot 11 and spout 12 forms no part of the present invention, and it will be appreciated that instead of the spigot a nipple could be provided for making a detachable connection to pipes, hoses, or the like. The lower end of the body 10 has a sidewardly extending, continuous, narrow flange 14 and extending therebelow a threaded boss 15, which boss is adapted to be inserted through a suitable opening in a sink, wash basin, or the like (not shown) with which the faucet valve is to be used and have suitable nuts and/or washers (not shown) threaded thereon from the lower end for cooperating with the flange 14 and positioning the faucet valve relative to the said sink, wash basin, or the like.

The body 10, the boss 15, and the spigot 11 may be cast or otherwise formed integrally and are hollow or thin walled in construction providing, respectively, an inner chamber 16 in the body 10, an inlet passage 17 in the boss 15, and an outlet passage 18 in the spigot 11 and downwardly extending spout 12, all of which passages and chamber form a continuous passage. As shown, the central portion of the body 10 from which the spigot 11 extends is slightly globular in shape providing for an increase in diameter of the chamber 16 over the diameter of the inlet passage 17. The body 10 has a continuous interior flange or partition 20 dividing the chamber 16 into an upper chamber 16a and a lower chamber 16b. The flange 20 has a central opening or bore 21 communicating the upper and lower chambers 16a, 16b, respectively. As shown, the upper chamber 16a communicates with the passage 18 of the spigot 11 while the lower chamber 16b communicates with the inlet passage 17 in the boss 15. The upper side of the flange 20 has a counterbore 23 concentric with the opening 21 of greater depth radially outwardly from the opening 21, providing an upwardly extending and circular lip 24 adjacent to and concentric with the opening 21 forming a valve seat against which a valve proper, shown generally at 26, on the lower end of a valve stem 27 is adapted to be moved into and out of sealing engagement to close and open, respectively, the opening 21, and thus the inlet passage 17 and the passage 18 to communication whereby the flow of water or otherwise through the faucet valve may be readily controlled.

The above described structure is generally conventional in faucet valves of the type to which this invention pertains. In such faucet valves, the valve stem must be supported for suitable movement, thus requiring packing or glands between the moving parts so as to prevent leakage or otherwise. Conventionally the valve stem extends in threaded engagement for longitudinal movement through a valve stem opening in the valve body. A packing gland is provided comprising suitable packing material and a cap nut surrounding the stem and threaded on exterior threads on the body concentric with the valve stem opening. Tightening down of the cap nut squeezes the packing material against the surfaces of the valve body surrounding the valve stem opening and against the surface of the valve stem.

With such a construction, the packing is usually forced against the stem over a considerable area and with considerable pressure in order to obtain full sealing or packing action. Turning of the stem is many times quite difficult. The cap nut being threaded on the outside of the valve body has a large diameter and detracts considerably from the appearance of the assembled valve.

The present invention contemplates a valve and valve stem bushing assembly wherein the assembled valve may have a smooth, streamlined appearance and the packing bears against the valve stem on a small area in an improved manner whereby movement or turning of the stem is considerably simplified. In the embodiment shown the upper end of the body 10 has an opening or bore 30 extending vertically through an upwardly extending cylindrical boss 28 having an upper end or surface 29. The bore 30 preferably has an axis aligned with the axis of the opening 21 and is internally threaded. A valve stem bushing 32 forms a bonnet for the valve body 10 and a closure for the bore 30 and comprises an outer upper head 33 and a lower externally threaded boss 31 of reduced diameter which is threadably engaged in the threaded bore 30. The head 33 is positioned above the boss 28 and is generally rounded or semi-spherical in shape (see Fig. 3) with the lower edge of its surface flush or coextensive with the outer surface of the body 10, thus providing a smooth, attractive, and modern streamlined appearance. Flats 34, 35 oppositely disposed on the spherical surface of the bushing 32 may be provided for enabling a wrench to be used for assembling and disassembling the bushing with the body 10.

The head 33 has a circumferentially continuous or annular, downwardly facing surface or shoulder 37 intermediate the lower edge of its outer surface and the outer cylindrical threaded sides of the boss 31. When the bushing 32 is assembled with the body 10, the surface 37 is in opposed slightly spaced relationship to the upper surface or end 29 of the boss 28. In the embodiment shown, the surface 29 has a central, annular, upwardly extending, V-shaped bead 40 which engages in a corresponding central, annular, V-shaped groove 41 in the surface 37. The vertical or axial dimension of the bead 40 shown is slightly greater than the vertical or axial depth of the groove 41 whereby as the boss 31 on the bushing 32 is threaded into the bore 30 in the boss 28, the upper edge of the bead 40 will engage the base of the groove 41 before the surfaces 29, 37 engage. Because of the relatively small area of the bead 40 and the pressures which may be imposed thereon when the bushing 32 is threaded down tight using a wrench or otherwise, the bead 40 and particularly the upper point thereof may or may not be deformed slightly and to a sufficient extent to completely fill the groove 41 and provide a water tight permanent seal, preventing leakage of water or other fluid thereby and providing a packingless seal for the bushing relative to the body 10. It will be appreciated that the groove 41 could be formed in the surface 29 and the bead formed on the surface 37. Also, more than one mating groove and bead could be provided. If desired the angle of the groove 41 could be made greater than the angle of the bead 40.

The bushing 32 is generally elongated and has a valve stem receiving bore 43 axially aligned with the opening 21, the lower end of which bore is threaded and the upper end of which bore is provided with an annular packing ring groove 45 in which a packing ring 46, preferably of the O-ring type, is positioned. As shown in the drawing, the packing ring 46 is trapped in its annular groove by the stem 27 and such groove lies wholly internally of the head 33. The valve stem 27 is generally elongated and is supported for rotative and axial movement in the bore 43. The stem 27 comprises an upper elongated smooth shank 49 extending through the packing ring 46 and out of the bore 43, the upper end of which shank is suitably formed to detachably receive a valve operating handle (not shown) of conventional construction. The lower end of the valve stem 27 is enlarged providing a shoulder 52 which limits the upward axial movement of the valve stem 27 by abutting against the lower end of the boss 31. The lower end of the enlargement has an axial, upwardly extending, threaded aperture and a concentric larger counterbore, in which counterbore a suitable non-metallic valve washer 50 is positioned. A headed screw 51 passes through a central opening in the washer 50 into threaded engagement in the threaded aperture, thus retaining the washer and valve stem in assembled relationship while at the same time permitting removal of the washer 50 for replacement purposes or otherwise. The enlargement and the sealing washer comprise the valve proper 26 which is conventional in construction. Intermediate the smooth shank and the enlargement, the valve stem 27 is threaded for engagement with the threads of the bore 43 whereby when the valve stem 27 is rotated in the appropriate direction the valve may be moved towards or away from the valve seat 24. The pitch of the threads is preferably relatively large wherefore a relative small rotative movement of the valve stem 27 may completely open or close the valve.

The cross-sectional diameter of the packing ring 46 is preferably such in relation to the diameter of the base of the groove 45 and the diameter of the smooth shank 49 that it is continuously compressed radially, thus providing a continuous seal against the leakage of fluids from the chamber 16a through the bore 43 exteriorly of the faucet valve. If desired, the axial width of the groove 45 may be made slightly larger than the compressed axial width of the packing ring 46 whereby a slight axial movement of the ring may result on each reversal of movement of the valve stem 27.

To assemble the faucet valve shown, the O-ring 46 is first inserted in the groove 45 by deforming the ring sufficiently to pass through the upper end of the bore 43. The upper or handle receiving end of the valve stem 27 minus the handle is then inserted into the lower end of the bore 43 and pushed upwardly therethrough past the packing ring 46 until the threads on the stem engage the threads of the bore 43. The valve stem is then threaded upwardly in the bore 43 until the enlarged portion engages the lower end of the boss 31. The bushing and stem assembly is then inserted, valve first, into the threaded bore 30 of the boss 28 and the bushing 32 threaded into the boss until the bead 40 engages the base of the groove 41. At this time a wrench or otherwise may be positioned on the wrench engaging flats and turned to forcefully engage the bead 40 against the base of the groove 41 and provide a firm leakproof metallic seal.

Thus it will be seen that an embodiment of the invention has been described which accomplishes the objects of the invention enumerated above and others, and which provides a simple, economically manufactured, and leakproof valve structure which will function without trouble or other difficulty over long periods of time.

Although in accordance with the provisions of the patent statutes this invention is described as embodied in concrete form and the principle thereof has been described together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claim.

Having thus described my invention, I claim:

In a faucet, a one-piece hollow metal body containing a fluid passage and a surrounding valve seat and also having an upper end portion provided with an internally threaded opening extending into the body in substantially coaxial relation to said valve seat, a valve element movable in said body for cooperation with said seat and controlling said passage, said upper end portion having a straight cylindrical external shape and a substantially right-angular flat annular end face surrounding said opening, a one-piece metal bonnet forming a closure for said opening and comprising a substantially semispherical head and an internally and externally threaded integral axial sleeve projecting from said head and having threaded engagements in said opening, an actuating stem connected with said valve element and projecting through said bonnet and having an external thread thereon for cooperation with the internal thread of said sleeve, said semispherical head of said bonnet having an external diameter substantially equal to the external diameter of said cylindrical upper end portion such that said head forms a smooth flush continuation of and spherically rounded top on said upper end portion, said head also having a substantially flat annular face on the underside thereof in surrounding relation to said sleeve and corresponding substantially in radial width with the flat annular end face of said upper end portion, and annular ridge and groove elements carried by the flat annular faces of said head and said upper end portion in substantially coaxial surrounding relation to said threaded sleeve and to the internally threaded body opening and having mating engagement with each other and forming a localized metal-to-metal seal directly between said body and bonnet, said ridge and groove elements having a cross-sectional shape defined by a sharp-pointed V and said ridge element being of a height to completely fill the groove element, said ridge and groove elements being brought into said mating engagement by rotation of said bonnet relative to said body in screwing the threaded sleeve of said bonnet into the internally threaded opening of said body.

ERWIN J. WAGNER.

REFERENCES CITED

The following references are of record in the file of this patent:

UNITED STATES PATENTS

| Number | Name | Date |
|---|---|---|
| 1,537,433 | Griffen | May 12, 1925 |
| 1,537,755 | Dowling | May 12, 1925 |
| 2,255,634 | Walsh | Sept. 9, 1941 |
| 2,394,364 | Christensen | Feb. 5, 1946 |

FOREIGN PATENTS

| Number | Country | Date |
|---|---|---|
| 1,028 | Australia | of 1931 |
| 575,542 | Great Britain | of 1946 |
| 690,277 | France | of 1930 |
| 726,883 | France | of 1932 |